US011982217B2

United States Patent
Andersson et al.

(10) Patent No.: US 11,982,217 B2
(45) Date of Patent: May 14, 2024

(54) INTERNAL COMBUSTION ENGINE SYSTEM

(71) Applicant: VOLVO TRUCK CORPORATION, Gothenburg (SE)

(72) Inventors: Lennart Andersson, Skällinge (SE); Fredrik Rahm, Hörby (SE)

(73) Assignee: VOLVO TRUCK CORPORATION, Gothenburg (CH)

( * ) Notice: Subject to any disclaimer, the term of this patent is extended or adjusted under 35 U.S.C. 154(b) by 0 days.

(21) Appl. No.: 18/330,636

(22) Filed: Jun. 7, 2023

(65) Prior Publication Data

US 2023/0399964 A1 Dec. 14, 2023

(30) Foreign Application Priority Data

Jun. 13, 2022 (EP) .................................. 22178670

(51) Int. Cl.
*F01N 3/00* (2006.01)
*F01N 3/02* (2006.01)
(Continued)

(52) U.S. Cl.
CPC ........... *F01N 3/005* (2013.01); *F01N 3/0205* (2013.01); *F01N 3/021* (2013.01); *F01N 3/2892* (2013.01);
(Continued)

(58) Field of Classification Search
CPC ........ F01N 3/005; F01N 3/0205; F01N 3/021; F01N 3/2892; F01N 2240/02;
(Continued)

(56) References Cited

U.S. PATENT DOCUMENTS

2005/0076863 A1* 4/2005 Baba .................... F01K 23/065
                                                               123/41.82 R
2013/0333381 A1  12/2013 Bourhis
(Continued)

FOREIGN PATENT DOCUMENTS

DE   102020005212 A1   10/2020
EP      3546709 A1     10/2019
(Continued)

OTHER PUBLICATIONS

Extended European Search Report in corresponding European Application No. 22178670.0 dated Sep. 28, 2022 (7 pages).

*Primary Examiner* — Audrey B. Walter
(74) *Attorney, Agent, or Firm* — Venable LLP; Jeffri A. Kaminski

(57) ABSTRACT

An internal combustion engine, ICE, system for a vehicle includes an ICE operable on hydrogen; an exhaust gas aftertreatment system, EATS, arranged in an exhaust gas circuit downstream the ICE, said EATS having at least one NOx reduction device and/or a particulate filter, and an exhaust gas water recovery, EWR, system arranged at least partly downstream the EATS in the exhaust gas circuit, said EWR system having at least a primary exhaust cooler and a water separator; a waste heat recovery, WHR, system for providing a rankine cycle, said WHR system being arranged to transport a working fluid, WF, through the primary exhaust cooler of the EWR system; a low temperature coolant circuit in fluid communication with an exhaust condenser of the EWR system; and a water management system arranged to collect water from the EWR system and transport water to at least one combustion chamber of the ICE.

17 Claims, 4 Drawing Sheets

(51) Int. Cl.
  *F01N 3/021* (2006.01)
  *F01N 3/28* (2006.01)
  *F01P 3/20* (2006.01)
  *F01P 5/10* (2006.01)
  *F02B 43/10* (2006.01)
  *F02B 53/10* (2006.01)
  *F02M 25/03* (2006.01)

(52) U.S. Cl.
  CPC  *F01P 3/20* (2013.01); *F01P 5/10* (2013.01); *F02B 43/10* (2013.01); *F02M 25/03* (2013.01); *F01N 2240/02* (2013.01); *F01N 2240/22* (2013.01)

(58) Field of Classification Search
  CPC .. F01N 2240/22; F01N 2550/05; F01N 3/029; F01N 3/0814; F01N 3/206; F01N 3/2066; F01N 2590/08; F01N 2610/1406; F01N 5/00; F01P 3/20; F01P 5/10; F02B 43/10; F02M 25/03; F02M 25/022; F02G 2260/00; F02G 5/02
  See application file for complete search history.

(56) References Cited

U.S. PATENT DOCUMENTS

| | | |
|---|---|---|
| 2018/0266360 A1 | 9/2018 | Tateno |
| 2018/0371954 A1* | 12/2018 | Copeland ............... F02C 6/006 |
| 2019/0301310 A1* | 10/2019 | Ekström ............... F01K 23/065 |

FOREIGN PATENT DOCUMENTS

| | | | |
|---|---|---|---|
| JP | 2013199882 A | * | 10/2013 |
| JP | 2013199882 A | | 10/2013 |

\* cited by examiner

INTERNAL COMBUSTION ENGINE SYSTEM

TECHNICAL FIELD

The present disclosure relates to an internal combustion engine system for a vehicle. The disclosure is applicable on vehicles, in particularly heavy-duty vehicles, such as e.g. trucks. However, although the present disclosure will mainly be described in relation to a truck, the internal combustion engine system may also be applicable for other types of vehicles propelled by means of an internal combustion engine. In particular, the present disclosure can be applied in heavy-duty vehicles, such as trucks, buses and construction equipment, but also in cars and other light-weight vehicles etc. Further, the internal combustion engine is typically a hydrogen internal combustion engine.

BACKGROUND

For many years, the demands on internal combustion engines have been steadily increasing. By way of example, reducing exhaust gases, increasing engine efficiency, reducing fuel consumption, and lowering noise level from the engines are some of the criteria that have become more important when designing an internal combustion engine (ICE) system for a heavy-duty vehicle. At least for these reasons, the components of the ICE systems have been continuously developed to meet the various demands from the market. The ICE system may generally need to be developed in view of both prevailing and expected future environmental regulations such as restrictions relating to maximum allowable amount of exhaust gas pollution. These environmental regulations are particularly relevant for heavy-duty vehicles, such as trucks.

One type of ICE system that may have the potential to meet prevailing and future environmental regulations is a hydrogen ICE system in which the combustion of hydrogen with oxygen produces water vapour as a main exhaust product. In such hydrogen ICE system, hydrogen fuel is supplied to the combustion cylinder in gaseous form and subsequently blended with compressed air so as to provide an appropriate mixture of hydrogen and air in the combustion cylinder when performing and completing the combustion reaction.

However, the use of hydrogen as a fuel component in ICE systems may present several challenges. By way of example, hydrogen ICE systems of various types may be provided with a water injection system to permit water injection into the cylinders of the ICE. The option of injecting water into the cylinders of the ICE may e.g. contribute to reducing generations of high NOx emissions in the exhaust gases from the ICE.

It would be desirable to improve the operation of ICE systems for combustion of hydrogen fuel, such as an ICE system operable on hydrogen gas. In addition, it would be desirable to further improve the water management system of such ICE systems control for heavy-duty vehicles.

SUMMARY

An object of the disclosure is to provide an improved operation of an internal combustion engine system having an internal combustion engine operable on a main fuel component containing hydrogen gas or hydrogen liquid.

According to a first aspect of the disclosure, there is provided an internal combustion engine, ICE, system for a vehicle. The ICE system comprises an ICE operable on a main fuel component containing hydrogen gas or hydrogen liquid. The ICE has at least one combustion chamber for combusting the main fuel component. The ICE system further comprises an exhaust gas aftertreatment system, EATS, arranged in an exhaust gas circuit downstream the ICE, the EATS having at least one NOx reduction device and/or particulate filter. The EATS further comprises an exhaust gas water recovery, EWR, system arranged at least partly downstream the at least one NOx reduction device and/or particulate filter in the exhaust gas circuit. The EWR system comprises at least a primary exhaust cooler for cooling exhaust gases and a water separator for separating water from the exhaust gases. In addition, the ICE system comprises a waste heat recovery, WHR, system for providing a rankine cycle, the WHR system being arranged and configured to transport a working fluid, WF, through the primary exhaust cooler of the EWR system, thereby allowing cooling of the primary exhaust cooler. Further, the ICE system comprises a low temperature coolant circuit in fluid communication with an exhaust condenser of the EWR system. Moreover, the ICE system comprises a water management system arranged in fluid communication with the water separator of the EWR system, the water management system being arranged and configured to collect water from the EWR system and transport water in a liquid fluid circuit to the at least one combustion chamber, thereby providing for a recycling of water from the exhaust gases to the ICE.

By the arrangement of the EWR system, the WHR system and the water management system, it becomes possible to provide a more efficient and lean ICE system using hydrogen fuel. In particular, the arrangement of the EWR system, the WHR system and the water management system provides for recycling water from the exhaust gases in an energy efficient way, while also reducing the need of any conventional EGR system to recirculate the exhaust gases.

More specifically, by providing an ICE system which combines exhaust gas water recovery, provided by the EWR system, with waste heat recovery, provided by the WHR system, it will become possible to reduce the needed cooling capacity of the exhaust gases. The arrangement and configuration of the water management system provides for an efficient water recovery, thereby at least partly decreasing the needed air/fuel ratio in the ICE. An efficient water recovery and water management system also provide for higher exhaust gas temperature and a higher efficiency in the WHR system. A high availability of water will also make an EGR system unnecessary.

While the present disclosure may be used in any type of ICE system having an ICE operable on a main fuel component containing hydrogen gas or hydrogen liquid, the present disclosure is particularly useful for a hydrogen internal combustion system. Hence, according to at least one embodiment, the ICE system is a hydrogen ICE system. In particular, the proposed ICE system is suitable for spark-ignited internal combustion engines, utilizing hydrogen direct injection so as to achieve high engine power output and efficiency with low emissions. One of the many advantages of using hydrogen in ICE systems as a clean alternative fuel is its zero-carbon content. This means that carbon-based emissions, mainly CO, $CO_2$, HC and soot, can be eliminated, leaving NOx as the only harmful combustion by-product.

However, the proposed ICE system may also be operated on other fuel mixtures where the main fuel component is, or contain, hydrogen gas or hydrogen liquid. Hence, the proposed ICE system is not restricted to ICE system purely operating on hydrogen and air, but also includes ICE systems operating on hydrogen gas or liquid hydrogen as main fuel, but which can be mixed or ignited by some other fuel, such as mixtures between hydrogen and for example methane/natural gas. In such ICE systems, the hydrogen fuel component is still a carbon free fuel, being an $H_2$ molecule even if mixed with molecules that contain carbon. Such fuel mixtures may also be denoted as so called hydrogen $H_2$ doped fuel mixtures. Thus, while the proposed ICE system is mainly intended for pure hydrogen ICE systems, it may also be possible to use in partially hydrogen-based ICE systems and also in a hydrogen-CNG ICE system.

While hydrogen can be combusted in an ICE over a wide range of fuel-air mixtures and may be operated to produce low emissions during certain conditions, it has also been noted the amount of recirculated exhaust (EGR) has an impact of the NOx emission. However, the present ICE system proposes an ICE system that is capable of eliminating the need of an EGR system that recirculates exhaust. In particular, the arrangement of the low temperature coolant circuit in the ICE system provides for operating the ICE system using the WHR in relatively high temperature external environments and without using any EGR system.

Another challenge with hydrogen ICE systems is that the combustion of air/fuel in a hydrogen ICE system may pose higher demands on the strength and size of the engine components compared to e.g. a traditional gasoline and diesel ICE system. Accordingly, the prevailing combustion conditions for hydrogen combustion are different compared to gasoline ICE systems. The proposed ICE system allows for providing relatively homogeneous conditions to avoid poorly mixed zones that can cause end-gas ignition (knock). This advantage is at least partly provided by using a water management system. The use of a water management system in the ICE system allows for recycling water from the exhaust to be injected to the combustion chamber.

The water management system may thus generally be configured to receive water from the water separator, store the received water, and further configured to transfer any stored water to the combustion chamber. The proposed ICE system may thus also contribute to a higher level of water recovery potential, a possibility of using a smaller water tank, while still increasing the efficiency of the WHR system since all exhaust energy go to the WHR system (no EGR) which also increase the overall engine system efficiency.

One function of the EATS in the ICE system is to ensure that the recovered water is clean, and thus not corrosive. In other words, the arrangement of the proposed ICE system provides for collecting the water after EATS system so as to ensure cleaner water.

Another challenge with condensing water from the exhaust is that the needed cooling capacity may increase substantially, requiring substantive operation of a fan, radiator, or the like. Such operation of the ICE system will likely have a negative impact on the fuel consumption. The proposed ICE system provides for improving the fuel consumption by the provision of the WHR and the arrangement of the low temperature coolant circuit in the ICE system.

In an ICE system comprising at least one NOx reduction device, the ICE system may further comprise a by-pass valve assembly having a by-pass valve device arranged in-between the NOx reduction device and the primary exhaust cooler. The by-pass valve assembly may be configured to control the supply of exhaust gas to the EWR system in response to a control signal indicative of any one of an available coolant capacity of the low coolant temperature circuit and a needed power for the exhaust condenser of the EWR system. One advantage with the by-pass valve assembly is that an improved cooling control of the exhaust is provided. In addition, the cooling control of the exhaust is provided upstream the primary exhaust cooler. Such arrangement may be particularly useful in operating situations where the primary exhaust cooler already creates a sufficient level of condensate.

By way of example, the by-pass valve assembly may be configured to by-pass the EWR system in response to a control signal indicative of an insufficient coolant capacity.

In some example embodiment, the by-pass valve device may be a first by-pass valve device, and the by-pass valve assembly may further comprise a second by-pass valve arranged in-between the primary exhaust cooler and the exhaust condenser.

As such, the by-pass valve assembly may comprise a set of by-pass valves arranged and controllable to provide for individual bypass of the WHR and EWR systems. Such type of arrangement may thus provide for reducing the need of condensation if the water storage and collecting system of the water management system is full.

The WHR system may comprise a condenser configured to condense the working fluid, WF, by any one of the low temperature coolant circuit and an additional high temperature coolant circuit. By way of example, the condenser may be arranged and configured to condense the working fluid, WF, by the low temperature coolant circuit and by another temperature coolant circuit such as a high temperature coolant circuit. In other examples, the condenser may be arranged and configured to condense the working fluid, WF, either by the low temperature coolant circuit or by another temperature coolant circuit, such as a high temperature coolant circuit. Hence, the condenser may be arranged and configured to condense the working fluid, WF, by the low temperature coolant circuit and/or another temperature coolant circuit, such as a high temperature coolant circuit.

The WHR system may comprise a fluid pump for directing the working fluid through the WHR system.

As mentioned above, the EATS may further comprise a particulate filter. In an ICE system where the EATS comprises both the NOx reduction device and the particulate filter, the particulate filter may be arranged downstream the NOx reduction device and upstream the primary exhaust cooler in the exhaust gas circuit.

Alternatively, where the EATS comprises both the NOx reduction device and the particulate filter, the particulate filter may be arranged downstream the primary exhaust cooler. In other words, the particulate filter is arranged downstream NOx reduction device and further arranged downstream the primary exhaust cooler. Hereby, the EATS system is divided so that the NOx reduction catalyst is positioned upstream of the combined EWR system and WHR system and the particulate filter is positioned downstream the primary exhaust cooler. This way, the particulate filter can be operated at a relatively low temperature and thus have a lower backpressure compared to an arrangement where the particulate filter is positioned upstream the primary exhaust cooler.

The particulate filter may further be arranged downstream the EWR and WHR systems in the exhaust gas circuit. By way of example, the particulate filter may be arranged downstream the water separator of the EWR system. This way, the particulate filter can be operated at a relatively low temperature and thus have an even lower backpressure compared to an arrangement where the particulate filter is positioned upstream the primary exhaust cooler.

The water management system may be operable to control a temperature of at least a portion of water contained in the water management system. Hereby, there is provided an even more efficient control of the EATS and the ICE system. The controllability of the system is thus increased in favourable manner.

The water management system may comprise a heater arranged to control the temperature of at least a portion of water contained in the water management system. Herby, it becomes possible to control the temperature of at least a portion of water contained in the water management system so that the water in the system is above a water freezing point.

The heater may generally be an electrical heater.

The water management system may be in fluid communication with a high temperature coolant circuit, the high temperature coolant circuit being arranged and configured to control the temperature of at least a portion of water contained in the water management system.

The water management system may be configured to be drained from water at a key-off operation so as to avoid freezing of any water in the ICE system.

The water management system may comprise a water injector disposed in a liquid fluid circuit. The water injector may be configured to inject water into the combustion chamber, or at a position before the combustion chamber. The liquid fluid circuit is generally configured to transport water. Hence, the liquid fluid circuit may be a water transport fluid circuit. One advantage with a water injector configured to inject water into the combustion chamber is that a more direct supply of water can be provided to combustion chamber. However, in other examples, the water can be injected by the injector at a position before the combustion chamber. Hereby, there is provided an improved system in terms of required space for the components. It may also have a positive impact on the vaporization process of the water.

The exhaust gas water recovery, EWR, system may further comprise the exhaust condenser being arranged in between the primary exhaust cooler and the water separator in the exhaust gas circuit.

The low temperature coolant circuit may comprise at least a fluid pump for directing the coolant in the low temperature coolant circuit.

The ICE system may be a hydrogen otto-cycle ICE system. According to one embodiment, the ICE operates in a four-stroke configuration. In other embodiments, the ICE operates in a two-stroke configuration. In other embodiments, the ICE operates in an eight-stroke configuration.

The ICE system may further comprise at least one turbo charger.

According to a second aspect of the present disclosure, there is provided a vehicle comprising an internal combustion engine system according to the first aspect of the disclosure.

Effects and features of this second aspect of the present disclosure are largely analogous to those described above in connection with the first aspect of the disclosure. Embodiments mentioned in relation to the first aspect of the present disclosure are largely compatible with the second aspect of the disclosure.

Further advantages and advantageous features of the disclosure are disclosed in the following description and in the dependent claims. It should also be readily appreciated that different features may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION

Figure 1:
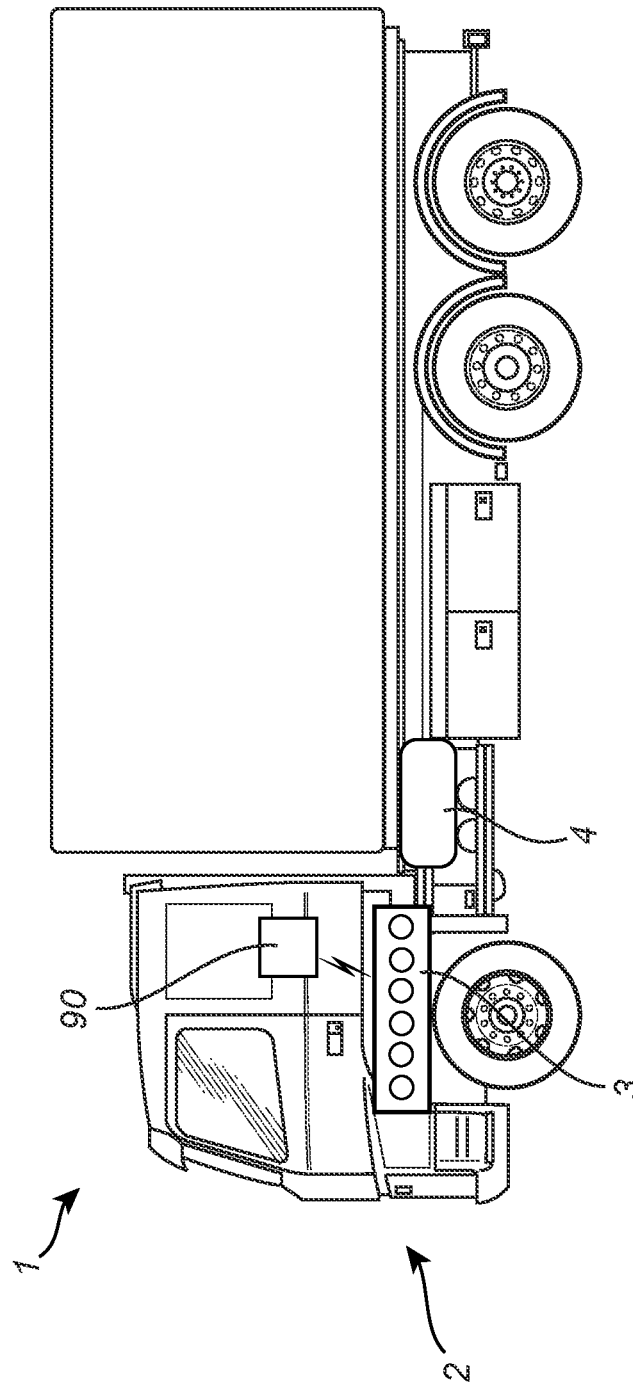
FIG. 1 is a side view of a vehicle comprising an internal combustion engine (ICE) system according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

With particular reference to FIG. 1, there is provided a vehicle 1 in the form of a truck. The vehicle 1 comprises an internal combustion engine, ICE, system 2 for powering and driving the vehicle 1. The ICE system 2 in FIG. 1 also comprises an ICE 3. In particular, the ICE 3 is configured to be operable on a main fuel component containing hydrogen gas. Thus, the ICE 3 is intended for combustion of hydrogen gaseous fuel. In particular, the ICE system 2 is a hydrogen piston ICE system, such as a hydrogen otto-cycle ICE system.

By way of example, the ICE 3 may advantageously be a four-stroke spark-ignition ICE with a hydrogen gas direct injection system. A hydrogen ICE 3 operable according to a conventional four stroke process performs an intake stroke, a compression stroke, a combustion stroke and an exhaust stroke.

The combustion in such hydrogen ICE system 2 is based on a combustion of air and hydrogen, as is commonly known in the art. While the combustion of hydrogen with oxygen may only produce water as its only product in a pure combustion process between hydrogen and oxygen, a hydrogen ICE system 2 based on combustion of air and hydrogen generally produce water, heat and NOx, as is commonly known in the art. In addition, hydrogen can be combusted in an internal combustion engine over a wide range of fuel-air mixtures. The hydrogen ICE system may be operated to produce very low emissions during certain conditions.

The ICE system 2 can be provided in several different arrangements. By way of example, it may also be possible to use a mixture of fuels, where the main fuel component is hydrogen. The hydrogen can either be provided in gaseous form or in liquid form. Hence, in other examples, the hydrogen ICE system may be operated based on hydrogen liquid as the main fuel component.

In FIG. 1, the truck is a vehicle 1 with a single propulsion system where traction power is provided by the hydrogen piston ICE system 2. However, the truck may likewise be a hybrid electric vehicle. By way of example, the hybrid electric vehicle comprises a supporting electric propulsion system having at least one high-voltage battery and at least one electric machine, and further the hydrogen ICE system 2.

As depicted in FIG. 1, the ICE system 2 further comprises a control unit 90, herein also denoted as a controller. The controller 90 is typically an integral part of a main electronic control unit for controlling the vehicle 1 and various parts of the vehicle. The controller 90 is arranged in communication with the components of the ICE system 2, in particular the ICE 3. The controller 90 is configured to control the components of the ICE system 2. The controller 90 may likewise be a separate part of the vehicle 1 and communicate with the main electronic control unit for controlling the vehicle and various parts of the vehicle.

Figure 2:
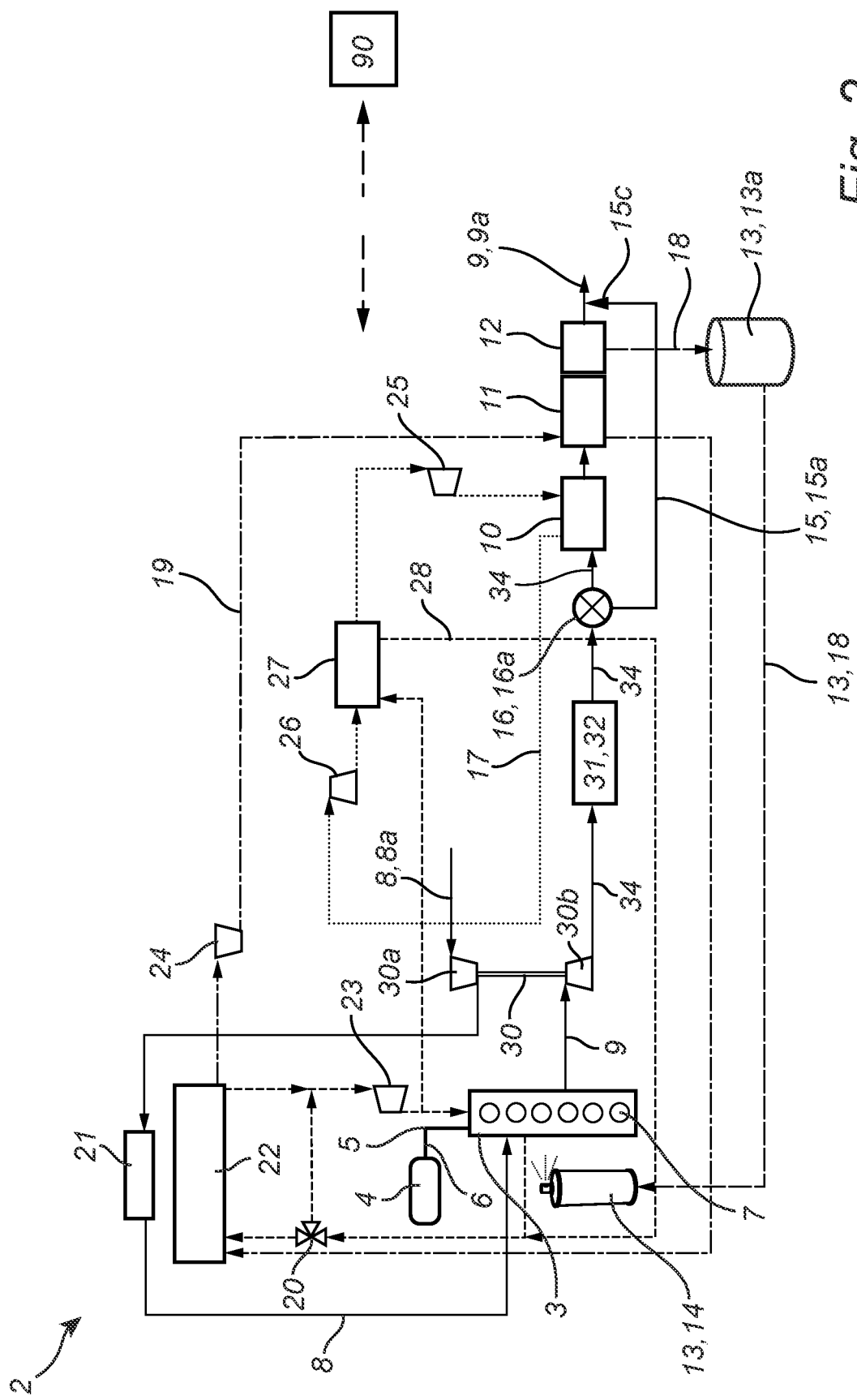
FIG. 2 schematically illustrates an ICE system according to an example embodiment of the present disclosure.

Turning now to FIG. 2, there is depicted an example embodiment of the ICE system 2 for incorporation in the vehicle 1 as described above in relation to FIG. 1. FIG. 2 provides an overview of various parts of the hydrogen gas piston ICE system 2 according to an example embodiment. The ICE 3 comprises one or more cylinders (not illustrated), one or more corresponding combustion chambers and one or more corresponding pistons reciprocating within the cylinders. Each one of the combustion chambers 7 is at least partially delimited by a corresponding cylinder. Each one of the pistons is arranged and configured to reciprocate inside a corresponding cylinder. The piston is arranged to reciprocate inside the cylinder such that the ICE is operated to combust hydrogen gas fuel, whereby the motion of the piston reciprocating in the cylinder is transmitted to a rotational movement of a crank shaft (not illustrated). The crank shaft is further coupled to a transmission (not shown) for providing a torque to driving elements. In case of a heavy-duty vehicle, such as a truck, the driving elements are wheels; however, the ICE system 2 may also be used for other equipment such as construction equipment, marine applications, etc.

As illustrated in FIG. 2, the ICE 3 comprises a number of combustion chambers 7 for combusting the hydrogen gas as the main fuel component. The hydrogen gas is generally provided to the combustion chambers of the ICE by means of hydrogen fuel system and one or more fuel injectors. By way of example, as also illustrated in FIGS. 1 and 2, the ICE system 2 thus comprises a hydrogen fuel tank 4 containing the hydrogen fuel in gaseous form. The hydrogen fuel may also be partly arranged in liquid form in the hydrogen fuel tank 4. In FIG. 2, hydrogen gas fuel 6 is supplied to the ICE 3 from the hydrogen fuel tank 4 via a hydrogen fuel circuit 5 of the ICE system 2. The hydrogen fuel circuit 5 is arranged and configured to contain and transport the hydrogen gas fuel, as illustrated in FIG. 2, and may optionally include one or more additional fuel system components such as a fuel pump, fuel filter etc. The hydrogen fuel gas is eventually injected into the chambers 7 of the ICE 3 by one or more fuel gas injections (not illustrated). The fuel injectors are connected and in fluid communication with the hydrogen gas fluid conduit 5. These components are of conventional types and thus not further described herein.

The ICE system 2 here also comprises an air intake system 8 and an exhaust gas system 9, as depicted in FIG. 2. The air intake system 8 defines an air inlet circuit and comprises an air inlet 8a for receiving fresh air from the outside, as illustrated in FIG. 2. The air intake system 8 comprises a multiple number of inlet channels having at least one inlet valve for controlling a flow of inlet air to the combustion chambers 7 of the cylinders. By way of example, the ICE 3 has an intake manifold forming one or more intake guides arranged to guide air to the cylinders of the ICE 3.

In FIG. 2, the air intake system 8 also comprises a charge-air-cooler, CAC, 21. The CAC 21 is normally provided in the form of a conventional air to air cooled arrangement in the vehicle 1, but it can also be a liquid coolant cooled arrangement solution. The CAC 21 is arranged to cool supercharged combustion air blown into the ICE 3 for enhancing engine performance.

In a similar vein, the exhaust gas system 9 defines an exhaust gas circuit 34, as illustrated in FIG. 2. The exhaust gas system 9 also has a corresponding exhaust gas outlet 9a, as illustrated in FIG. 2. The exhaust gas system 9 comprises at least one, but typically a multiple number of exhaust channels having a least one exhaust valve for controlling discharge of exhaust gases produced from the fuel combustion process taking place in the combustion chambers 7 within the cylinder(s). The ICE 3 generally comprises one or more exhaust ports with corresponding exhaust valves. The exhaust gas system 9 is thus configured and arranged to guide gases from the cylinders to the outlet 9a via the exhaust gas circuit 34. The air intake system 8 and the exhaust gas system 9 are of conventional types and thus not further described herein.

Turning again to FIG. 2, the ICE system 2 optionally comprises a turbocharger 30. The turbocharger 30 is arranged to receive exhaust gases from the ICE 3. The turbocharger 30 receives exhaust gases from the ICE 3 via the exhaust gas system 9. The turbocharger 30 comprises an exhaust gas inlet and an exhaust gas outlet. The exhaust gas inlet is in fluid communication with the exhaust gas ports of the ICE 3.

As depicted in FIG. 2, the turbocharger 30 comprises a turbine Sob. The turbine 30b is powered by exhaust gas from the ICE 3. Moreover, as illustrated in e.g. FIG. 2, the turbocharger 30 comprises a compressor 30a for compressing intake air and feeding the intake air to the ICE 3. The compressor 30a is thus in fluid communication with the ICE air intake system 8. The compressor 30a is also in fluid communication with the air inlet 8a, as illustrated in FIG. 2. The compressor 30a is thus an intake air compressor arranged in the air intake system 8 and the turbine Sob is an exhaust gas turbine arranged in the exhaust gas system 98. By way of example, the compressor 30a of the turbocharger is a centrifugal compressor. The intake air centrifugal compressor 30a is operatively connected via a shaft 30c to the exhaust gas turbine Sob, see FIG. 2. During operation of the ICE system 2, the exhaust gas may exhibit a first pressure and temperature drop between the exhaust gas inlet and exhaust gas outlet of the turbocharger, which pressure drop is converted by a turbine wheel of the turbine Sob into kinetic energy that is driving a compressor wheel of the compressor 30a, which feeds compressed air to the ICE 3.

As illustrated in FIG. 2, the ICE system 2 further comprises an aftertreatment system 31. The aftertreatment system is here a so-called exhaust gas aftertreatment system, EATS. The EATS 31 is disposed in the exhaust gas stream downstream the ICE 3. As such, the EATS 31 is arranged in the exhaust gas circuit 34 downstream the ICE 3.

The EATS is typically also arranged downstream the exhaust gas turbine Sob. The ICE system may further include a wastegate (not illustrated) arranged to allow exhaust gas to bypass the exhaust gas turbine Sob.

The EATS 31 may generally contain catalytic converters and similar components for treating the exhaust gas. In FIG. 2, the EATS 31 comprises a NOx reduction device 32. The NOx reduction device 32 is a common component of an EATS system, and thus not further described herein.

As the ICE is operable on hydrogen gas, the produced exhaust gases contain water as a by-product. It has been observed that the water in the exhaust gases may at least partly be recovered and subsequently used in the combustion process in the cylinders rather than injecting fresh water from a separate and heavy water tank. Thus, the ICE system 2 here comprises an exhaust gas water recovery, EWR, system and a water management system, as will be further described hereinafter in relation to FIG. 2.

In particular, the EATS 31 comprises the exhaust gas water recovery, EWR, system. In FIG. 2, the EWR system comprises a primary exhaust cooler 10 for cooling exhaust gases, an exhaust condenser 11 for condensing exhaust gases and a water separator 12 for separating water from the exhaust gases. The primary exhaust cooler 10 may be a conventional heat exchanger, such as a flat plate heat exchanger or a tub heat exchanger. The exhaust condenser may e.g. be a conventional heat exchanger, such as a surface condenser, e.g. a water-cooled shell and tube heat exchanger installed to condense exhaust gases. The water separator 12 can be a separate part of the EATS 31 or an integral part of the exhaust condenser 11. The exhaust separator is a conventional exhaust separator configured to separate exhaust gases and coolant water. The water separator 12 is generally provided with an outlet for gases and an outlet for water.

In FIG. 2, the components of the EWR system, i.e. the primary exhaust cooler 10, the exhaust condenser 11 and the water separator 12, are arranged downstream the NOx reduction device 32 in the exhaust gas circuit 34. Moreover, the exhaust condenser 11 is arranged in between the primary exhaust cooler 10 and the water separator 12 in the exhaust gas circuit 34.

In addition, as depicted in FIG. 2, the ICE system 2 comprises a waste heat recovery, WHR, system 25, 26, 27. The WHR system 25, 26, 27 is arranged and configured to provide a rankine cycle. The WHR system 25, 26, 27 is thus provided in the ICE system 2 to use waste heat of the ICE 3. More specifically, the WHR system 25, 26, 27 is based on a Rankin cycle, which uses heat of the exhaust gas of the ICE 3 for heating a working fluid 17 in the primary exhaust cooler 10 that in turn drives an expander 26. The WF 17 is thereafter circulated to a condenser 27. The primary exhaust cooler 10 may thus also be considered as an integral part of the rankine cycle.

The working fluid, WF, 17 is e.g. a liquid working fluid, such as water or a water-based fluid with ammoniac. Alcohol-based working fluids may likewise be conceivable.

The WHR system 25, 26, 27 is here arranged and configured to transport the WF 17 through the primary exhaust cooler 10 of the EWR system. Hereby, the EWR system is arranged to allow for a desired cooling of the primary exhaust cooler 10 by means of the components making up the WHR system 25, 26, 27.

In a Rankine cycle, the WF 17 of the WHR system 25, 26, 27 usually cycles through four stages, wherein in a first stage the WF 17 in liquid phase is pumped from low pressure to high pressure by means of the fluid pump 25. In the subsequent stage, the high pressure liquid WF 17 enters the primary exhaust cooler 10, where it is heated by the exhaust gases, to be converted into its gaseous phase. In the next stage, the gaseous phase WF 17 expands through the expander 26. The expander 26 may, for example, be a displacement expander, such as a piston engine, and/or a turbine, which is driven by the thermal energy of the working fluid 17. In its last stage, the WF 17 is cooled down in the condenser 27 and converted back to its liquid phase. The condenser 27 is hereby configured to condense the WF 17. As will be further described hereinafter, the condenser 27 is arranged and configured to condense the WF 17 by several different coolant circuits.

To sum up, the WHR system 25, 26, 27 thus comprises the fluid pump 25, the expander 26 and the condenser 27. The fluid pump 25, the expander 26 and the condenser 27 together with the primary exhaust cooler 10 provides the Rankine cycle.

The vehicle 1 here also comprises a thermal management system in the form of a cooling system. The main function of the cooling system is to ensure that the ICE 3 runs at its optimum operating temperature. In FIG. 2, there is depicted some parts of a cooling system suitable for regulating the temperature of one or more components of the ICE system 2. More specifically, the ICE system 2 here comprises a high temperature coolant circuit 28 and a low temperature coolant circuit 19, as schematically illustrated in FIG. 2.

The high temperature coolant circuit 28 is arranged and configured to cool the ICE 3. The low temperature coolant circuit 19 is arranged and configured to cool the exhaust condenser 11, as depicted in FIG. 2. The high temperature coolant circuit 28 and the low temperature coolant circuit 19 are also arranged in fluid communication with a radiator 22. In FIG. 2, the high temperature coolant circuit 28 and the low temperature coolant circuit 19 are interconnected at a position upstream the radiator 22 and at a position downstream the radiator 22.

The radiator 22 generally acts as a heat exchanger for the ICE 3 and the components of the ICE system 2. In FIG. 2, the radiator 22 is e.g. a front radiator of the vehicle 1. The radiator 22 is generally considered an integral part of the high temperature coolant circuit 28. In addition, or alternatively, the radiator 22 is an integral part of the low temperature coolant circuit 19. In other examples, the radiator 22 is a separate part of the ICE system 2 which is arranged in fluid communication with the high temperature coolant circuit 28 and the low temperature coolant circuit 19.

As illustrated in FIG. 2, the high temperature coolant circuit 28 here comprises a thermostat 20, the radiator 22 and a primary fluid coolant pump 23. In addition, the high temperature coolant circuit 28 contains a coolant. The coolant circulating in the high temperature coolant circuit 28 is generally a liquid coolant, e.g. water. The primary fluid coolant pump 23 is arranged and configured to transfer the coolant fluid to the ICE 3.

As illustrated in FIG. 2, the high temperature coolant circuit 28 is also in fluid communication with the condenser 27 of the WHR system. Hence, the high temperature coolant circuit 28 is configured to regulate a temperature of the condenser 27. As such, the condenser 27 is arranged and configured to condense the working fluid, WF, 17 by the high temperature coolant circuit 28.

Eventually, the coolant of the high temperature coolant circuit 28 again enters the radiator 22, where it cools down to a suitable temperature. The thermostat 20 is arranged and configured to act as a valve for the coolant and may only allow coolant to pass through the radiator 22 when a certain temperature has been exceeded. The high temperature coolant circuit 28 uses the thermostat 20 to regulate the normal operating temperature of the ICE 3. When the ICE 3 reaches its normal operating temperature, the thermostat 20 is triggered. Thereafter, the coolant can enter the radiator 22.

In FIG. 2, the thermostat 20 is a three-way valve to keep the coolant in the high temperature coolant circuit 28 at a suitable high temperature level. The above components making up the high temperature coolant circuit 28 are well-known components of a high temperature coolant circuit 28 of an ICE system for a heavy-duty vehicle, and thus not further described herein. The high temperature coolant circuit 28 can also be provided in other configurations depending on type of vehicle and ICE system 2.

Turning again to FIG. 2, the ICE system 2 also comprises the low temperature coolant circuit 19. The low temperature coolant circuit 19 thus contains a coolant. The coolant circulating in the low temperature coolant circuit 19 is generally a liquid coolant, e.g. water. The low temperature coolant circuit 19 is arranged in fluid communication with the exhaust condenser 11 of the EWR system. Accordingly, the condenser 27 is arranged and configured to condense the working fluid, WF, 17 by the low temperature coolant circuit 19. The low temperature coolant circuit 19 is generally configured to control a temperature of the coolant passing through the exhaust condenser 11 to a suitable temperature level. In FIG. 2, the low temperature coolant circuit 19 comprises its own coolant fluid pump 24 for directing the coolant through the circuit. The coolant pump 24 may be of a conventional pump, as the primary fluid coolant pump 23 of the high temperature coolant circuit 28. As such, the low temperature coolant circuit comprises at least one fluid pump 24 for directing coolant in the low temperature coolant circuit 28.

The coolant temperature in the low temperature coolant circuit 19 is generally lower than the temperature of a coolant in a standard high temperature coolant circuit of an ICE system, such as the high temperature coolant circuit 28. By way of example, the coolant temperature in the low temperature coolant circuit 19 is below 55 degrees C. In other words, the low temperature coolant circuit 19 is arranged and configured to control a temperature of its coolant to a temperature level ensuring that portions of coolant circulating in fluid communication with the exhaust condenser 19 is below 55 degrees C. Other temperature levels may also be conceivable depending on vehicle and system.

It should be noted that the arrangement of the low temperature coolant circuit 19 can be varied in several different manners than the example in FIG. 2 with the combination of the low temperature coolant circuit 19 and high temperature coolant circuit 28. That is, in FIG. 2, the low temperature coolant circuit 19 is arranged in fluid communication with the high temperature coolant circuit 28. However, in other examples, the low temperature coolant circuit 19 may be a separate coolant circuit in fluid communication with e.g. the radiator 22 of the vehicle 1, such as the front radiator of the vehicle. In other examples, the low temperature coolant circuit 19 may be a separate coolant circuit in fluid communication with a separate radiator of the vehicle 1, i.e. a radiator arranged upstream (in front of) the radiator 22. Alternatively, the low temperature coolant circuit 19 may also be arranged in fluid communication with an additional cooling system. Hence, to sum up, the condenser 27 of the WHR system is configured to condense the working fluid, WF, 17 either by the low temperature coolant circuit or the high temperature coolant circuit 28. However, in other examples, the condenser 27 of the WHR system is configured to condense the working fluid, WF, 17 by the low temperature coolant circuit and the high temperature coolant circuit 28.

Thus, FIG. 2 merely illustrates one example of a combination of cooling circuits forming the thermal management system of the vehicle and the ICE system 2.

In addition, as illustrated in FIG. 2, the ICE system 2 comprises a water management system 13. The water management system 13 is arranged in fluid communication with the water separator 12 of the EWR system. Further, the water management system 13 is arranged and configured to collect water from the EWR system and transport water in a liquid fluid circuit 18 to the combustion chamber(s) 7 of the ICE 3. Hereby, the water management system 13 is arranged and configured to provide a recycling of water from the exhaust gases to the ICE 3. Generally, the liquid fluid circuit 18 is a circuit configured to transport water, and may thus herein also be denoted as a water transport fluid circuit 18.

As illustrated in FIG. 2, the water separator 12 is fluidly connected to the water management system 13 by means of the water transport fluid circuit 18. The water transport fluid circuit 18 is here an integral part of the water management system 13.

In FIG. 2, the water management system 13 also comprises a water tank 13a for storing the water. The water tank 13a is arranged and configured to store water separated by means of the water separator 12. The water tank 13a is disposed in the water transport fluid circuit 18. Accordingly, the water separator 12 comprises an outlet in fluid communication with an inlet of the water tank 13a.

In addition, in FIG. 2, the water management system 13 comprises a water injector 14. The water injector 14 is disposed in the water transport fluid circuit 18. The water injector 14 is configured to inject water into the combustion chamber(s) 7. It should be noted that water may likewise be injected at a position before the combustion chamber(s) 7. However, in FIG. 2, the water is directly injected into the combustion chambers) 7 of the ICE by one or more injectors 14.

In order to control the flow of exhaust gas to the EWR system formed by the primary exhaust cooler 10, the exhaust condenser 11 and the water separator 12, the ICE system 2 may comprise one or more by-pass channels and by-pass valves. FIG. 2 depicts an example of the ICE system 2 with a single by-pass channel 15a. More specifically, the ICE system 2 here comprises a by-pass channel arrangement 15 having a by-pass valve assembly 16 with a first by-pass valve device 16a. The first by-pass valve device 16a is arranged in-between the EATS 31, such as in-between the NOx reduction device 32, and the primary exhaust cooler 10 of the EWR system, as illustrated in FIG. 2. That is, the first by-pass valve device 16a is arranged in the exhaust gas circuit 34 at a position in-between the NOx reduction device 32 and the primary exhaust cooler 10 of the EWR system.

Moreover, the by-pass channel arrangement 15 extends between the position in the exhaust gas circuit 34 that is located in-between the NOx reduction device 32 and the primary exhaust cooler 10 of the EWR system to a position 15c of the exhaust gas circuit 34 that is located downstream the water separator 12.

Further, the first by-pass valve device 16a is arranged as a by-pass channel valve device and configured to control the supply of exhaust gas in a selective manner to the primary exhaust cooler 10 or to the by-pass channel 15a. The by-pass valve assembly 16 is configured to control the supply of exhaust gas to the EWR system in response to a control signal indicative of any one of an available coolant capacity from the low coolant temperature circuit 19 and a needed power for the exhaust condenser 11 of the EWR system. More specifically, the first by-pass valve device 16a is arranged and configured to control the supply of exhaust gas to the EWR system in response to a control signal indicative of an available coolant capacity and a needed power from the EWR system. The coolant capacity can be determined by measuring the coolant level and/or the coolant temperature in the low coolant temperature circuit 19. The coolant capacity can also be determined by measuring the coolant level and/or the coolant temperature in the high coolant temperature circuit. The coolant capacity is generally dependent on the boiling temperature of the fluid in the coolant temperature circuit. By way of example, the by-pass valve assembly is configured to by-pass the EWR system in response to a control signal indicative of an insufficient coolant capacity. An insufficient coolant capacity is determined by comparing the coolant level and/or the coolant temperature with a predetermined threshold level. Hence, if the measured coolant level and/or the coolant temperature is below the threshold level, the by-pass device 16a is operable to direct exhaust gas through the by-pass channel 15a. That is, the EWR system is by-passed if the control unit receives a control signal indicative of an insufficient coolant capacity.

The needed power for the exhaust condenser 11 of the EWR system can be determined e.g. from a look-up table stored in a memory of the control unit 90 or from calculations performed by a processing circuit of the control unit 90 based on various received data.

Figure 3:
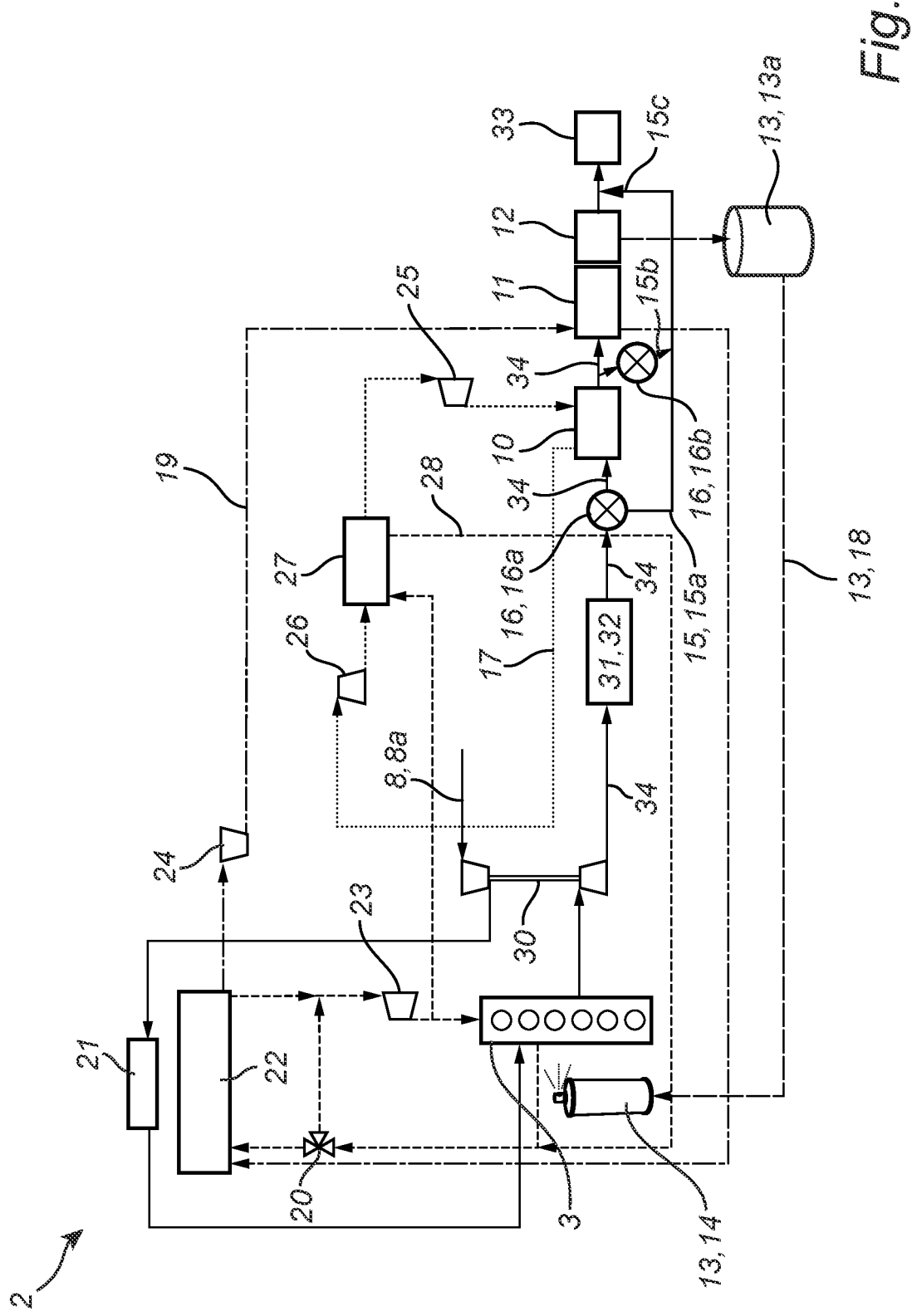
FIG. 3 schematically illustrates another ICE system according to an example embodiment of the present disclosure.

FIG. 3 schematically illustrates another example embodiment of the ICE system 2. The ICE system 2 in FIG. 3 comprises the features of the ICE system 2 as described in relation to FIG. 2. In addition, the by-pass channel arrangement 15 in FIG. 3 comprises a by-pass valve assembly 16 having a set of by-pass valve devices 16a and 16b. In a similar vein as the by-pass channel arrangement 15 in FIG. 2, the first by-pass valve device 16a is arranged in the exhaust gas circuit 34 at the position in-between the NOx reduction device 32 and the primary exhaust cooler 10 of the EWR system. The first by-pass valve device 16a is arranged and configured to control the supply of exhaust gas in a selective manner to the primary exhaust cooler 10 or to the by-pass channel 15a. The by-pass channel 15a is here a first by-pass channel of the by-pass channel arrangement 15. Moreover, in FIG. 3, the by-pass channel arrangement 15 comprises a second by-pass channel 15b and the by-pass valve assembly 16 comprises the second by-pass valve device 16b. The second by-pass valve device 16b is arranged in the exhaust gas circuit 34 at a position in-between the primary exhaust cooler 10 and the exhaust condenser 11 of the EWR system. The second by-pass valve device 16b is arranged as an additional by-pass channel valve device and configured to control the supply of exhaust gas in a selective manner to the exhaust condenser 11 or to the second by-pass channel 15b.

In FIG. 3, the by-pass channel arrangement 15 also exits in the exhaust gas circuit 34 at the position 15c of the exhaust gas circuit 34, which is located downstream the water separator 12. Thus, the by-pass channel arrangement 15 comprises the first by-pass channel extending from the position of the valve device 16a in the exhaust gas circuit 34, which is located in-between the NOx reduction device 32 and the primary exhaust cooler 10 to the position 15c in the exhaust gas circuit 34, which is located downstream the water separator 12. In addition, the by-pass channel arrangement 15 comprises the second by-pass channel 15b extending from the position of the valve device 16b in the exhaust gas circuit 34, which is located downstream the primary exhaust cooler 10 to the position 15c in the exhaust gas circuit 34, which is located downstream the water separator 12.

To this end, the by-pass channel arrangement 15 of FIG. 3 comprises a set of by-pass valves 16a, 16b being arranged and controllable to provide for individual bypass of the WHR and EWR systems. A system with a set of by-pass valves 16a, 16b is particularly beneficially when there is a need for controlling the flow of exhaust gas when the storage tank 13 is partly or fully filled with water. By way of example, the by-pass valves 16a, 16b are configured to be controlled in response to a water level of the storage tank 13 and engine load on the ICE 3.

It is to be noted that the by-pass valve devices 16a and 16b are generally provided as flow control valves, such as direction flow control valves configured to route the flow of exhaust gas between the respective exhaust gas circuit 34 and the by-pass channel 15. Each one of the by-pass valve devices 16a and 16b is generally configured to be controlled by the control unit 90. The control signal can be received at the control unit 90 and/or directly received by an actuator of the corresponding by-pass valve device. Other configurations are also conceivable.

Turning again to FIG. 3, the EATS 31 here further comprises a particulate filter 33. The particulate filter 33 is configured to operate by trapping residuals particles from the exhaust of the ICE 3 operating on hydrogen fuel, preventing particles such as Ca, Mg and Zn from reaching the environment. The particulate filter 33 is of a conventional type to be used in a hydrogen ICE system 2. The particulate filter 33 is generally arranged downstream the NOx reduction device 32.

In FIG. 3, the particulate filter 33 is arranged downstream the NOx reduction device 32 and also downstream the EWR and WHR systems in the exhaust gas circuit 34. That is, in FIG. 3, the particulate filter 33 is arranged downstream the primary exhaust cooler 10. In addition, in FIG. 3, the particulate filter 33 is arranged downstream the exhaust condenser 11 and the water separator 12. By arranging the particulate filter 33 downstream the primary exhaust cooler 10, it becomes possible to protect the condensate from having particles. In addition, this arrangement in FIG. 3 provides for a lower pressure drop than when the particle filter is arranged downstream the NOx reduction device 32

In other example embodiments, although not illustrated, the particulate filter 33 is arranged downstream the NOx reduction device 32 and upstream the EWR and WHR systems in the exhaust gas circuit. By way of example, the particulate filter 33 is arranged downstream the NOx reduction device 32 and upstream the primary exhaust cooler 10.

In other example embodiments, the particulate filter 33 is arranged in-between the primary exhaust cooler 10 and the exhaust condenser 11. Hence, the particulate filter 33 is arranged downstream the NOx reduction device 32 and downstream the downstream the primary exhaust cooler 10, but upstream the exhaust condenser 11.

Figure 4:
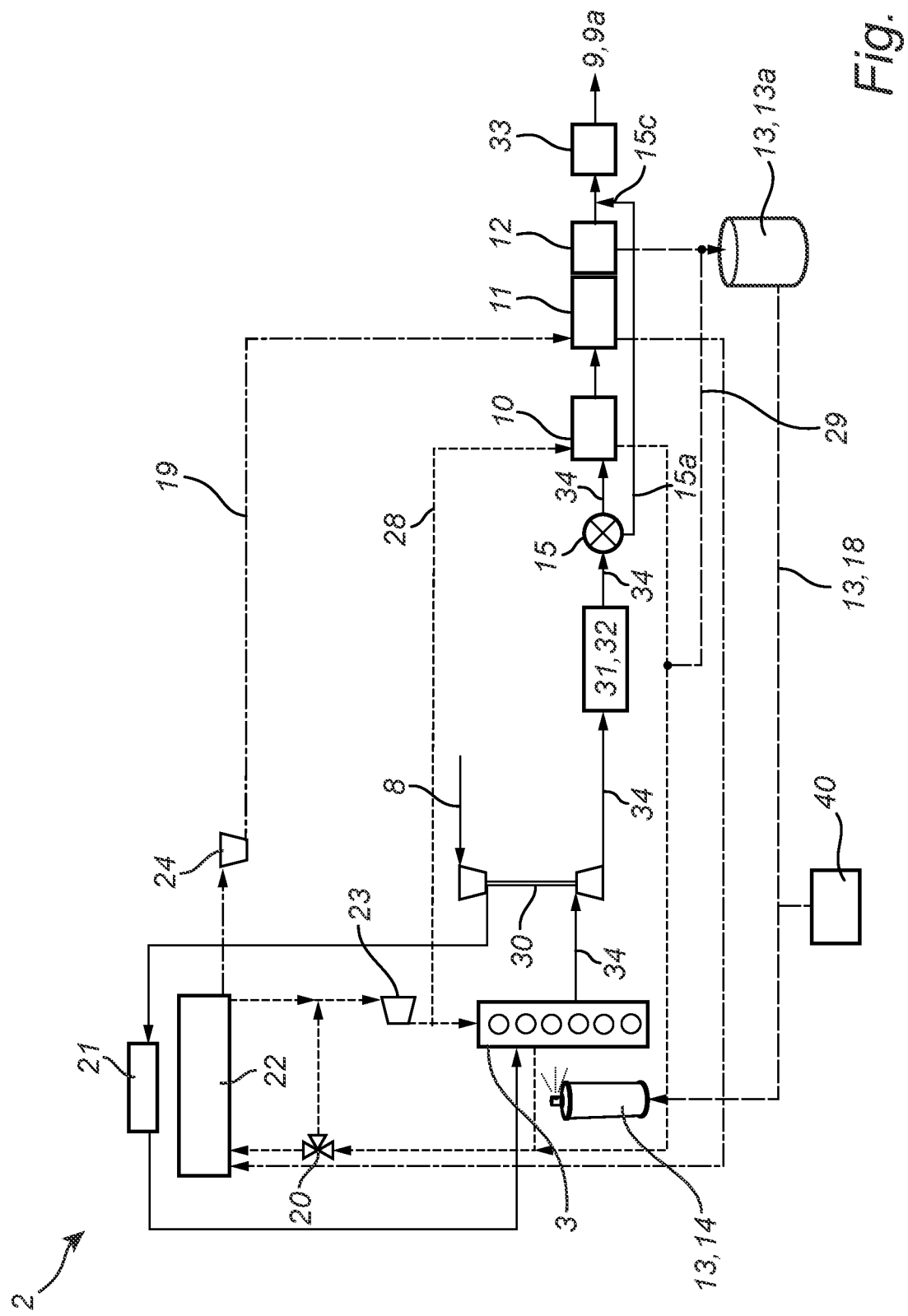
FIG. 4 schematically illustrates yet another ICE system according to an example embodiment of the present disclosure.

FIG. 4 schematically illustrates a combination of FIG. 2 having a by-pass valve assembly 16 with the first by-pass valve device 16a and where the particulate filter 33 is arranged downstream the primary exhaust cooler 10, downstream the exhaust condenser 11 and downstream the water separator 12. Accordingly, the ICE system 2 of FIG. 4 is provided without the second by-pass channel device 16b. It should be noted that the example in FIG. 4 also comprises the WHR system, although not specifically illustrated.

The water management system 13 can be operated in several different manners by the control unit 90. By way of example, the water management system 13 is operable to control a temperature of at least a portion of water contained in the water management system 13.

Moreover, in FIG. 4, the water management system 13 comprises a heater 40 arranged to control the temperature of at least a portion of water contained in the water management system 13. The heater 40 is disposed in the water transport fluid circuit 18.

In addition, in FIG. 4, the water management system 13 is in fluid communication with the high temperature coolant circuit 28. As illustrated in FIG. 4, the water management system 13 is in fluid communication with the high temperature coolant circuit 28 by an inter-connecting fluid channel 29. Hereby, the high temperature coolant circuit 28 is arranged and configured to control the temperature of at least a portion of water contained in the water management system 13.

In the example embodiments described in relation to FIGS. 2 to 4, the water management system 13 is favourably configured to be drained from water at a key-off operation so as to avoid freezing of the water in the ICE system 2. In this context, a key-off operation means that the ICE system 2 is shut down and the vehicle is turned off.

As mentioned herein, the control unit 90 is configured to control the by-pass valve assembly 16 in response to the control signal. Hence, the control unit 90 is configured to control the first by-pass valve device 16a and/or the second by-pass valve device 16b in response to the control signal. The control signal is indicative of any one of an available coolant capacity from the low coolant temperature circuit 19 and a needed power for the exhaust condenser 11 of the WHR system. The coolant capacity can be determined by measuring the coolant level and/or the coolant temperature in the low coolant temperature circuit 19. The needed power for the exhaust condenser 11 of the WHR system can be determined e.g. from a look-up table stored in the memory of the control unit 90 or from calculations performed by the processing circuit of the control unit 90 based on various received data. If the control unit 90 is the ECU, the control signal can e.g. be transferred from the ECU 90 to the valve devices 16a and 16b.

In addition, or alternatively, the control signal can be transferred from one or more sensors and other engine components of the ICE system 2.

The control signal generally contains data. The data can be stored in the memory of the control unit 90, wherein the processing circuitry of the control unit 90 is configured to perform the control of the by-pass valve assembly 16 based on the control signal containing the data. The control unit 90 thus generally comprises the processing circuitry (not illustrated).

As schematically illustrated in e.g. FIG. 2, the control unit 90 is here further arranged in communication with the by-pass valve assembly 16. The control unit 90 may be connected to the by-pass valve assembly 16 by wire or in a wireless fashion. Each one of the valve devices 16a, 16b may include corresponding controllers (not illustrated) with a processing circuitry configured to receive instructions from the control unit 90. In addition, or alternatively, the control unit 90 may be arranged in communication with the by-pass valve assembly 16 so as to control the exhaust gas flow by controlling one or more actuators of the by-pass valve assembly 16, as mentioned above. The actuator is generally arranged in communication with the control unit 90.

In addition, the valve devices 16a, 1613, as well as the water injector 14 can be controllable by several different type of actuators, including, but not limited, to pneumatic actuation control, electronic actuation control, electro-mechanic actuation control, hydraulic actuation control, and a combination thereof.

The control unit 90 may include a microprocessor, microcontroller, programmable digital signal processor or another programmable device. Thus, the controller typically comprises electronic circuits and connections as well as processing circuitry such that the control unit can communicate with different parts of the ICE system such as the ICE, the by-pass valve devices or any other component of the vehicle, such as the clutch, the gear box and/or any other parts in need of being operated in order to provide the functions of the example embodiments. Typically, the control unit may also be configured to communicate with other parts of the vehicle such as the brakes, suspension, and electrical auxiliary devices, e.g. the air conditioning system, in order to operate the vehicle according to the driver's needs. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

The control unit 90 may include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure also relates to an ICE system in the form of a hydrogen internal combustion engine, as described herein. The present disclosure further relates to a vehicle comprising the hydrogen ICE system, as described herein.

Even though the disclosure has been described with reference to specific exemplifying embodiments thereof, many different alterations, modifications and the like will become apparent for those skilled in the art. By way of example, the EATS 31 may in some examples only comprise the NOx reduction device 32 and no particulate filter. In other examples, the EATS 31 only comprises the particulate filter 33 but no NOx reduction device. By way of example, the particulate filter 33 is arranged as illustrated in any one of the FIGS. 2 to 4. In other examples, and where the is no NOx reduction device, the particulate filter 33 is arranged where the NOx reduction device is located in e.g. FIG. 2. However, in other examples, the EATS 31 comprises both the NOx reduction device 32 and the particulate filter 33. Accordingly, it is to be understood that the present disclosure is not limited to the embodiments described above and illustrated in the drawings; rather, the skilled person will recognize that many changes and modifications may be made within the scope of the appended claims.

The invention claimed is:

1. An internal combustion engine, ICE, system for a vehicle, said ICE system comprising:
   an ICE operable on a main fuel component containing hydrogen gas or hydrogen liquid, said ICE having at least one combustion chamber for combusting said main fuel component;
   an exhaust gas aftertreatment system, EATS, arranged in an exhaust gas circuit downstream the ICE, said EATS having at least one NOx reduction device and/or particulate filter, said EATS further comprising an exhaust gas water recovery, EWR, system arranged at least partly downstream the at least one NOx reduction device and/or particulate filter in the exhaust gas circuit, said EWR system having at least a primary exhaust cooler for cooling exhaust gases and a water separator for separating water from the exhaust gases;
   a waste heat recovery, WHR, system for providing a rankine cycle, said WHR system being arranged and configured to transport a working fluid, WF, through the primary exhaust cooler of the EWR system, thereby allowing cooling of the primary exhaust cooler;
   a low temperature coolant circuit in fluid communication with an exhaust condenser of the EWR system; and
   a water management system arranged in fluid communication with the water separator of the EWR system, said water management system being arranged and configured to collect water from the EWR system and transport water in a liquid fluid circuit to the at least one combustion chamber, thereby providing for a recycling of water from the exhaust gases to the ICE.

2. ICE system according to claim 1, wherein, the ICE system comprises the NOx reduction device, the ICE system further comprises a by-pass valve assembly having a by-pass valve device arranged in-between the NOx reduction device and the primary exhaust cooler, said by-pass valve assembly being configured to control the supply of exhaust gas to the EWR system in response to a control signal indicative of any one of an available coolant capacity of the low coolant temperature circuit and a needed power for the exhaust condenser of the EWR system.

3. ICE system according to claim 2, wherein the by-pass valve device is a first by-pass valve device, the by-pass valve assembly further comprising a second by-pass valve arranged in-between the primary exhaust cooler and the exhaust condenser.

4. ICE system according to claim 1, wherein the WHR system comprises a condenser configured to condense said working fluid, WF, by any one of the low temperature coolant circuit and an additional high temperature coolant circuit.

5. ICE system according to claim 1, wherein, said EATS comprises both the NOx reduction device and the particulate filter, said particulate filter being arranged downstream the NOx reduction device and upstream the primary exhaust cooler in the exhaust gas circuit.

6. ICE system according claim 1, wherein, said EATS comprises both the NOx reduction device and the particulate filter, said particulate filter being arranged downstream the primary exhaust cooler.

7. ICE system according to claim 6, wherein the particulate filter is further arranged downstream the water separator of the EWR system in the exhaust gas circuit.

8. ICE system according to claim 1, wherein said water management system is operable to control a temperature of at least a portion of water contained in the water management system.

9. ICE system according to claim 8, wherein said water management system comprises a heater arranged to control the temperature of at least a portion of water contained in the water management system.

10. ICE system according to claim 8, wherein said water management system is in fluid communication with a high temperature coolant circuit, said high temperature coolant circuit being arranged and configured to control the temperature of at least a portion of water contained in the water management system.

11. ICE system according to claim 1, wherein said water management system is configured to be drained from water at a key-off operation so as to avoid freezing of any water in the ICE system.

12. ICE system according to claim 1, wherein said water management system comprises a water injector disposed in a liquid fluid circuit, said water injector being configured to inject water into the combustion chamber, or at a position before the combustion chamber.

13. ICE system according to claim 1, wherein said exhaust gas water recovery, EWR, system further comprises the exhaust condenser being arranged in between the primary exhaust cooler and the water separator in the exhaust gas circuit.

14. ICE system according to claim 1, wherein the low temperature coolant circuit comprises at least a fluid pump for directing the coolant in the low temperature coolant circuit.

15. ICE system according to claim 1, wherein the ICE system is a hydrogen otto-cycle ICE system.

16. ICE system according to claim 1, wherein the ICE system further comprises at least one turbo charger.

17. A vehicle comprising an ICE system according to claim 1.

* * * * *